(12) United States Patent
Garnault et al.

(10) Patent No.: US 11,052,912 B2
(45) Date of Patent: Jul. 6, 2021

(54) DEVICE AND METHOD FOR ASSISTING WITH DRIVING A MOTOR VEHICLE

(71) Applicant: VALEO Schalter und Sensoren GmbH, Bietigheim-Bissingen (DE)

(72) Inventors: Alexandre Garnault, Créteil (FR); Thomas Heitzmann, Créteil (FR); Paulo Resende, Créteil (FR); Benazouz Bradai, Créteil (FR); Charles-Henri Quivy, Créteil (FR)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 358 days.

(21) Appl. No.: 16/078,311

(22) PCT Filed: Feb. 23, 2017

(86) PCT No.: PCT/EP2017/054257
§ 371 (c)(1),
(2) Date: Aug. 21, 2018

(87) PCT Pub. No.: WO2017/144627
PCT Pub. Date: Aug. 31, 2017

(65) Prior Publication Data
US 2019/0061757 A1    Feb. 28, 2019

(30) Foreign Application Priority Data

Feb. 23, 2016   (FR) ...................... 1651477

(51) Int. Cl.
*B60T 7/12*        (2006.01)
*B60W 30/16*    (2020.01)
(Continued)

(52) U.S. Cl.
CPC .......... *B60W 30/16* (2013.01); *B60W 30/143* (2013.01); *B60W 30/18145* (2013.01);
(Continued)

(58) Field of Classification Search
CPC .............. B60W 30/16; B60W 30/143; B60W 50/0097; B60W 30/18145;
(Continued)

(56) References Cited

U.S. PATENT DOCUMENTS

2010/0094509 A1* 4/2010 Luke ..................... B60W 40/02
701/45
2015/0085119 A1* 3/2015 Dagan ................ G06K 9/00805
348/148

(Continued)

FOREIGN PATENT DOCUMENTS

DE  10 2009 055787 A1  5/2011
DE  10 2012 025159 A1  6/2014
EP    1 736 797 A1  12/2006

OTHER PUBLICATIONS

International Search Report issued in PCT/EP2017/054257 dated Mar. 23, 2017 (2 pages).

(Continued)

*Primary Examiner* — Shardul D Patel
(74) *Attorney, Agent, or Firm* — Osha Bergman Watanabe & Burton LLP

(57) ABSTRACT

The invention relates to a driver-assistance device for assisting with driving a motor vehicle (1) following a road (2), this device comprising: a sensor suitable for acquiring a signal representative of the presence of an obstacle in the interior of a detection field (110) of this sensor, and a control module that is programmed to control a driver-assistance function for assisting with driving the motor vehicle, depending on the signal acquired by said sensor, and: a) to detect, on the basis of a position of the motor vehicle and of characteristics of said road, a section (20) of this road located outside of the detection field of said sensor, and b) in case of detection of this road section, to control said driver-assistance function while taking into account the potential presence of an (Continued)

Figure 1:
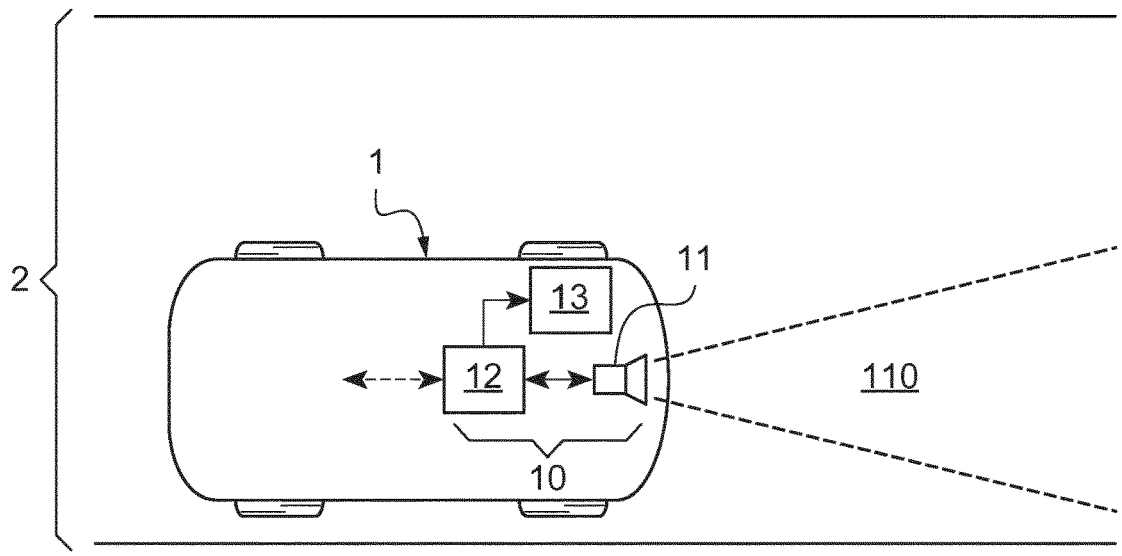

obstacle on said road section. An associated driver-assistance method is also described.

15 Claims, 3 Drawing Sheets

(51) Int. Cl.
  *B60W 50/00* (2006.01)
  *B60W 30/18* (2012.01)
  *B60W 30/14* (2006.01)
(52) U.S. Cl.
  CPC ..... *B60W 50/0097* (2013.01); *B60W 2420/42* (2013.01); *B60W 2552/15* (2020.02); *B60W 2552/30* (2020.02); *B60W 2554/00* (2020.02); *B60W 2554/801* (2020.02); *B60W 2556/50* (2020.02); *B60W 2720/10* (2013.01)
(58) Field of Classification Search
  CPC ......... B60W 2552/15; B60W 2552/30; B60W 2554/00; B60W 2554/801; B60W 2556/50; B60W 2420/42; B60W 2720/10; B60T 7/12
  USPC ...................................... 701/45, 96; 342/52
  See application file for complete search history.

(56) References Cited

U.S. PATENT DOCUMENTS

| | | | |
|---|---|---|---|
| 2015/0317901 A1* | 11/2015 | Hegemann | G08G 1/0141 701/117 |
| 2016/0129840 A1* | 5/2016 | Schofield | G08G 1/163 348/148 |
| 2017/0028916 A1* | 2/2017 | Schofield | G01S 13/931 |
| 2017/0113686 A1* | 4/2017 | Horita | B60W 30/09 |
| 2017/0168774 A1* | 6/2017 | Sugita | G06F 3/0481 |

OTHER PUBLICATIONS

Written Opinion of the International Searching Authority issued in PCT/EP2017/054257 dated Mar. 23, 2017 (5 pages).

* cited by examiner

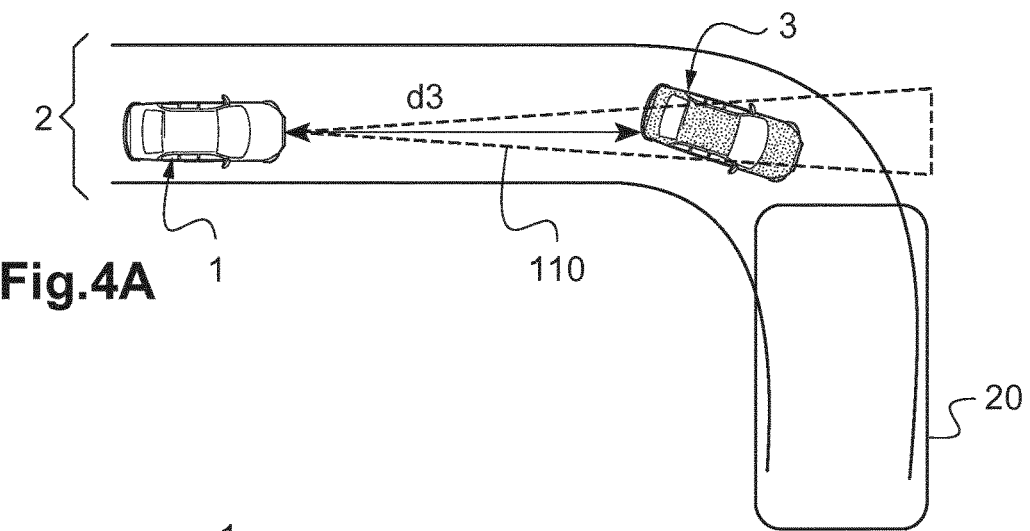
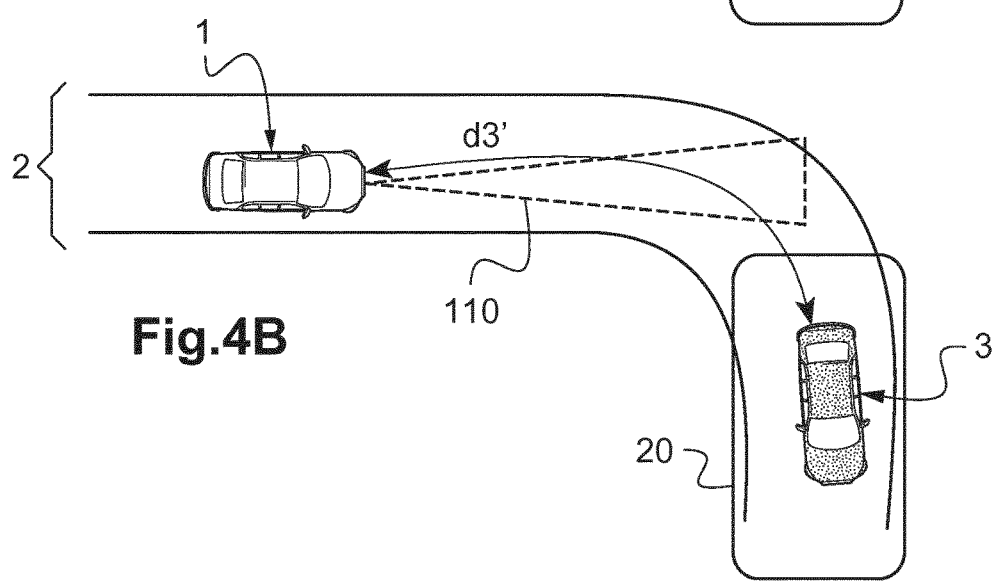
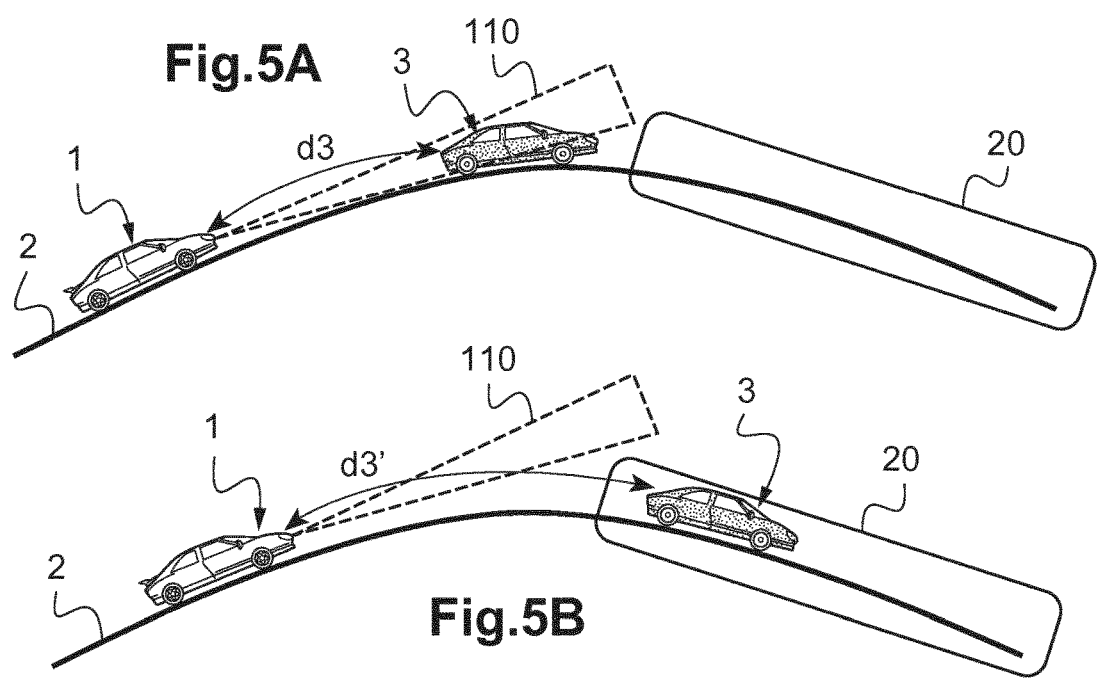

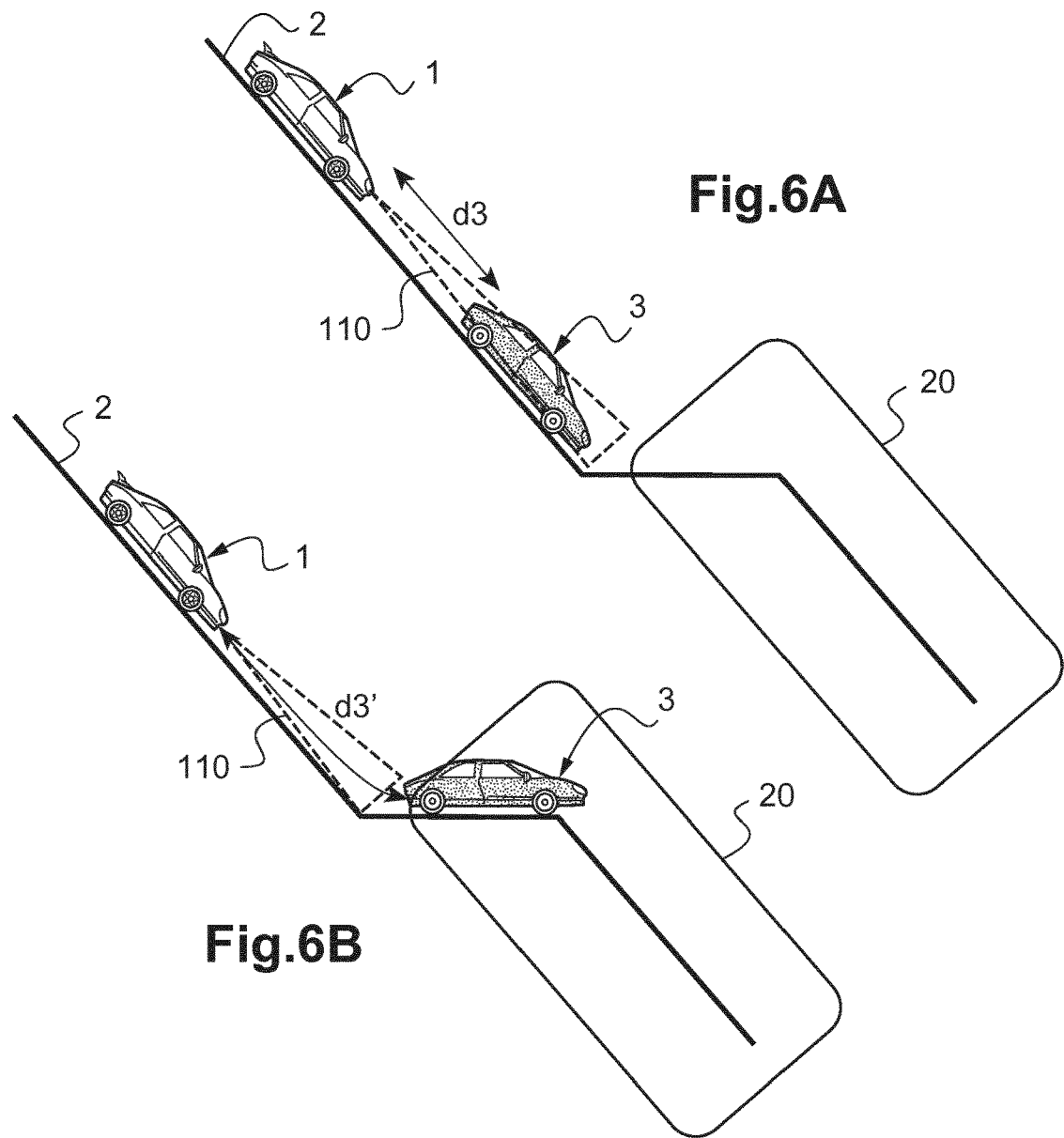
Fig.6A
Fig.6B
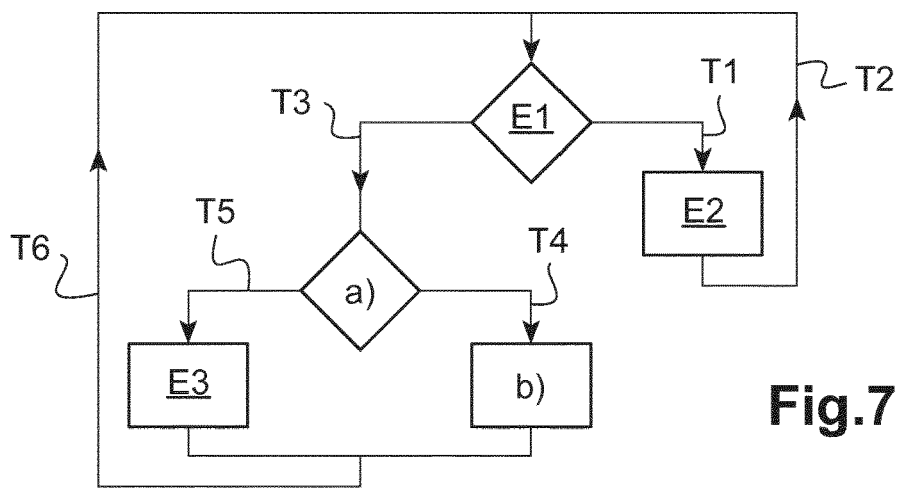
Fig.7

DEVICE AND METHOD FOR ASSISTING WITH DRIVING A MOTOR VEHICLE

TECHNICAL FIELD TO WHICH THE INVENTION RELATES

The present invention relates to a driver-assistance device and method for assisting with driving a motor vehicle.

It more particularly relates to a driver-assistance device comprising a sensor, such as an image sensor, allowing the presence of an obstacle on a road followed by this motor vehicle to be detected.

It particularly advantageously applies to a motor vehicle following a winding road exhibiting frequent changes in direction, or following a road exhibiting one or more abrupt changes in slope.

TECHNOLOGICAL BACKGROUND

Many motor vehicles are at the present time equipped with a driver-assistance device comprising a frontal camera allowing the presence of an obstacle, such as a pedestrian, an animal, or another vehicle, on a road followed by this motor vehicle, to be detected. Such a driver-assistance device is generally suitable for furthermore determining a distance separating this obstacle and the motor vehicle that is equipped therewith.

Such a driver-assistance device may furthermore be suitable for controlling various driver-assistance functions when this obstacle is detected.

A driver-assistance device such as described above, and which is suitable for commanding a deceleration of the motor vehicle, or for triggering a phase of assistance with braking when such an obstacle is detected, is in particular known.

A driver-assistance device that is suitable for controlling the speed of the motor vehicle in such a way that, when another vehicle is in front of it in the same lane, the distance separating the two vehicles is kept approximately equal to a setpoint distance, and to do so without intervention or with a minimal intervention by the driver, is also known.

However, a section of the road followed by the motor vehicle, toward which the latter is moving, may be located outside of the field of view of this frontal camera, for example when a bend or a peak of an incline is located facing the motor vehicle.

The driver-assistance device is then unable to detect the presence of an obstacle located on this road section, outside of the field of view of the frontal camera, this possibly disrupting the implementation of the aforementioned driver-assistance functions.

In such a situation the driver-assistance device may in particular erroneously interpret the absence of obstacle in the field of view of the camera as indicating an absence of obstacle on the road followed by the motor vehicle.

SUBJECT OF THE INVENTION

In order to remedy the aforementioned drawback of the prior art, the present invention provides a driver-assistance device for assisting with driving a motor vehicle following a road comprising:
 a sensor suitable for acquiring a signal representative of the presence of an obstacle in the interior of a detection field of this sensor, and
 a control module that is programmed to control a driver-assistance function for assisting with driving the motor vehicle, depending on the signal acquired by said sensor, the control module furthermore being programmed:
 a) to detect, on the basis of a position of the motor vehicle and of characteristics of said road, a section of this road located outside of the detection field of said sensor, and
 b) in case of detection of this road section located outside of the detection field of said sensor, to control said driver-assistance function while taking into account the potential presence of an obstacle on said road section.

Thus, detecting this road section located outside of the detection field of this sensor, and toward which section the motor vehicle is liable to move, completes, in a particularly advantageous manner, the information relating to the possible presence of an obstacle in the road environment of this vehicle, which information is drawn from the signal acquired by this sensor.

In particular, when no obstacle is detected by this sensor, the driver-assistance device may detect, by virtue of the invention, that an obstacle is nevertheless liable to be present on the road followed by the motor vehicle, thereby allowing the control of said driver-assistance function to be optimally tailored to the road environment through which the motor vehicle is moving.

Provision may in particular be made for the driver-assistance module to be programmed, in case of detection of this road section located outside of the detection field of said sensor, to control, i.e. command, said driver-assistance function as though an obstacle were actually present on this road section.

This measure is particularly advantageous when the driver-assistance function thus controlled comprises an obstacle-avoidance function, or a function for decreasing the speed of the motor vehicle on the approach of an obstacle, such as an emergency braking function or a braking-assistance function.

Provision may also be made for the driver-assistance module to be programmed, in case of detection of this road section located outside of the detection field of said sensor:
 to evaluate a distance separating the motor vehicle from a position at which, or from which, the obstacle potentially present on this road section is liable to be located, and
 to control said driver-assistance function depending on this distance.

Preferably, the driver-assistance device in addition comprises a navigation system including locating means that are suitable for determining said position of the motor vehicle, and digital map data comprising said characteristics of the road followed by the motor vehicle.

Said characteristics of the road followed by the motor vehicle may in particular comprise a piece of information representative of a change in direction and/or in slope of the road followed by the motor vehicle.

By virtue of this navigation system, the potential presence of an obstacle located on the road followed by the vehicle, outside of the detection field of said sensor, may be effectively detected, independently of the type of obstacle that could be present on said road section.

Another solution, for detecting the presence of an obstacle located on the road followed by the vehicle, outside of the detection field of said sensor, is based on the use of data exchanged between various vehicles being driven on said road, by way of wireless links and of a wireless network (or V2X network, V2X being the acronym of "Vehicle-to-X communication"). However, compared to the use of a GPS navigation system, the implementation of such a solution is more complex and expensive. Furthermore, this solution only allows the potential presence (outside of the detection field of said sensor) of an obstacle forming part of this communication network to be detected; it thus does not allow the presence of an obstacle corresponding to an animal, for example, to be detected.

The following are other nonlimiting and advantageous features of the driver-assistance device according to the invention:

the control module is furthermore programmed, in step a), to determine, on the basis of said position of the motor vehicle and of said characteristics of the road that it is following, a distance separating the motor vehicle from said road section, and, in step b), to control said driver-assistance function while taking into account this distance separating the motor vehicle from said road section;

said driver-assistance function comprises a function for decreasing the speed of the motor vehicle on the approach of an obstacle;

the control module is furthermore programmed, in step b), to command a deceleration of the motor vehicle when the distance separating the motor vehicle from said road section is smaller than a given limiting distance.

It is particularly advantageous to command such a deceleration of the motor vehicle when this road section is thus located at a distance from the vehicle smaller than said given limiting distance, because an obstacle may then be located on this road section, and therefore close to the vehicle, without this obstacle being detectable by means of said sensor.

Provision may also be made for the following:

said signal is furthermore representative of a distance separating the sensor and the obstacle present in its detection field;

the control module is furthermore programmed, when the presence of an obstacle in the detection field of said sensor is detected on the basis of the signal acquired by this sensor, then this obstacle exits from the detection field of this sensor and said road section located outside of the detection field of this sensor is detected in step a), to then conclude that said obstacle is present on said road section, and to control said driver-assistance function while taking into account the presence of this obstacle on said road section; or the control module is furthermore programmed, when it is concluded that said obstacle is present on said road section, to then determine a probable distance separating this obstacle and the motor vehicle, depending on a distance, between said obstacle and said sensor, determined on the basis of the signal having permitted beforehand the presence of this obstacle in the detection field of said sensor to be detected, and to control said driver-assistance function depending on said probable distance.

By virtue of this measure, the control module may advantageously continue to control a driver-assistance function based on a distance separating the motor vehicle and an obstacle located on said road, even if this obstacle is thus located outside of the detection field of said sensor.

Provision may also be made for the following:

the control module is furthermore programmed to determine said probable distance separating the motor vehicle and said obstacle depending on a speed of movement of this obstacle, determined depending on said signal having permitted beforehand the presence of this obstacle in the detection field of said sensor to be detected;

the control module is furthermore programmed to command a deceleration of the motor vehicle when said probable distance is smaller than a given safety distance;

said obstacle being another motor vehicle followed by the motor vehicle equipped with the driver-assistance device, and said driver-assistance function comprising a function for automatically following a vehicle, the control module is furthermore programmed to control the speed of the motor vehicle that is equipped therewith so that, when it is concluded that said followed vehicle is present on said road section, said probable distance is about equal to a given setpoint distance.

By virtue of this measure, the control module advantageously controls this function for automatically following a vehicle continuously, without interruption despite a momentary exit of the followed vehicle out of the detection field of said sensor.

This in particular avoids, when the followed vehicle exits from this detection field, the control module from needlessly commanding an acceleration (of the vehicle equipped therewith) even though the followed vehicle, although momentarily undetectable, has not left the road 2 over which these vehicles are being driven.

Provision may moreover be made for said sensor to comprise an image sensor.

The invention also provides a driver-assistance method for assisting with driving a motor vehicle following a road, in which a control module controls a driver-assistance function for assisting with driving the motor vehicle depending on a signal, acquired by a sensor, representative of the presence of an obstacle in the interior of a detection field of this sensor, this method comprising the following steps:

a) detecting, on the basis of a position of the motor vehicle and of characteristics of said road, a section of this road located outside of the detection field of said sensor, and b) in case of detection of this road section located outside of the detection field of said sensor, controlling said driver-assistance function while taking into account the potential presence of an obstacle on said road section.

The optional features presented above in device terms may be applied to the method that has just been presented.

DETAILED DESCRIPTION OF AN EXAMPLE EMBODIMENT

The following description, which makes reference to the appended drawings, which are given by way of nonlimiting example, will allow of what the invention consists and how it may be implemented to be clearly understood.

Figure 2:
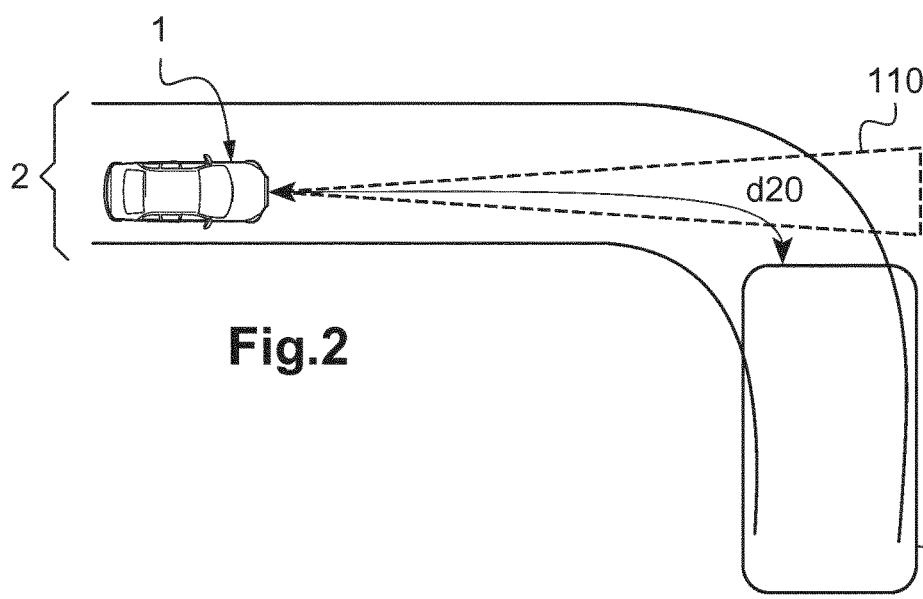
Figure 3:
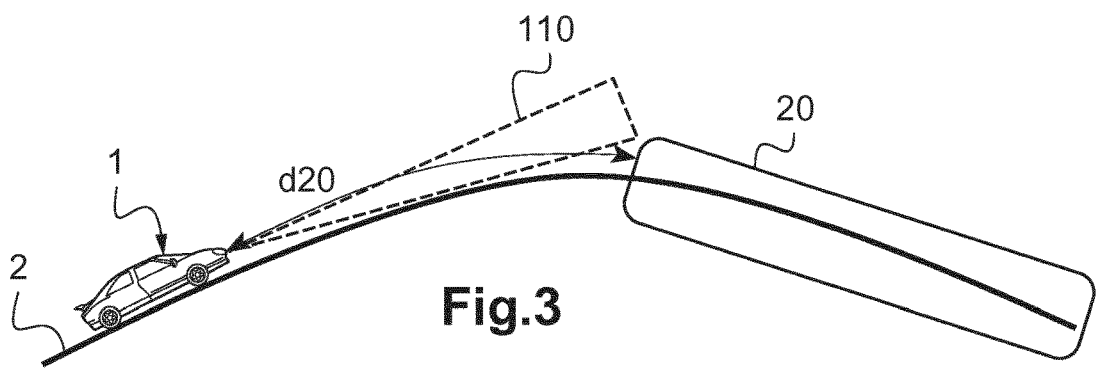

In the appended drawings:

FIG. 1 schematically shows, seen from above, a motor vehicle equipped with a driver-assistance device implementing the teachings of the invention, which includes a sensor suitable for acquiring a signal representative of the presence of an obstacle in its detection field;

FIGS. 2 and 3 schematically show two road configurations in which a section of a road followed by the motor vehicle of FIG. 1 is located outside of the detection field of the aforementioned sensor;

FIGS. 4A and 4B schematically show, at two successive times, a road configuration similar to that of FIG. 2, and in which the motor vehicle of FIG. 1 is furthermore following another motor vehicle;

FIGS. 5A and 5B schematically show, at two successive times, a road configuration similar to that of FIG. 3, and in which the motor vehicle of FIG. 1 is furthermore following another motor vehicle;

FIGS. 6A and 6B schematically show, at two successive times, another road configuration in which the motor vehicle of FIG. 1 is following another motor vehicle, and in which a section of the road followed is located outside of the detection field of said sensor; and FIG. 7 schematically shows, in the form of a flowchart, the main steps of a driver-assistance method implementing the teachings of the invention.

In FIG. 1, the main elements of a driver-assistance device 10 implementing the teachings of the invention have been schmematically shown.

This driver-assistance device 10 is suitable for being installed in a motor vehicle 1, in order to facilitate the driving thereof.

This driver-assistance device 10 comprises a sensor 11 suitable for acquiring a signal representative of the presence of an obstacle, such as a pedestrian, an animal, another vehicle or even an area of roadworks, in the interior of a detection field 110 of this sensor 11.

This sensor 11 may for example comprise an image sensor, such as a video camera. Said signal representative of the presence of an obstacle in its detection field, then corresponds to one or more images acquired by this image sensor.

This sensor 11 may also comprise a lidar (acronym of "LIght Detection And Ranging") or even a radar. Said signal acquired by this sensor 11 then for example comprises an echo signal acquired by this lidar or this radar, or data extracted from such an echo signal.

By detection field 110 of this sensor 11 what is meant is the region of space in which an obstacle may be detected by means of this sensor 11. For example, when this sensor takes the form of an image sensor, this detection field corresponds to the field of view of this image sensor, i.e. to the region of space the image of which is captured, i.e. acquired, by this image sensor.

Here, this sensor 11 is more precisely designed so that the signal that it acquires is not only representative of the presence of an obstacle in its detection field 110, but is also representative of a distance separating the sensor 11 and this obstacle.

When this sensor 11 comprises a lidar or a radar, this distance may in particular be deduced from a time-of-flight of the light wave or of the radio wave reflected by this obstacle present in the detection field 110, this time-of-flight being obtained from the echo signal captured by this lidar or this radar.

When this sensor 11 takes the form of an image sensor, this distance may for example be deduced from the size of the obstacle, in an image captured by the image sensor.

As a variant, said sensor could take the form of a hybrid sensor comprising a plurality of sensors, for example comprising both a video camera and a lidar.

The sensor 11 is here placed at the front of the motor vehicle 1. Its detection field 110 extends in front of the motor vehicle 1. More particularly, this detection field 110 is on the whole centred on the longitudinal axis of the vehicle 1. Thus, when the vehicle 1 is being driven in a straight line on a rectilinear road segment, this detection field 110 includes the portion of this road segment located in front of the vehicle 1. An obstacle toward which the motor vehicle 1 is being driven, and located on this road segment, may then be detected by means of this sensor 11.

The driver-assistance device 10 also comprises a control module 12, which receives the signal acquired by this sensor 11, or at the very least data extracted from this signal.

The position and orientation of the detection field 110 of the sensor 11 with respect to the motor vehicle 1, and its extent are known to the control module 12. More precisely, data representative of the position of the limits of this detection field 110 with respect to the vehicle 1 are recorded in a memory of the control module 12.

This control module 12 is suitable for controlling various units of the vehicle 1, in particular:
 an engine unit of this vehicle 1, so as to be able to control the speed of the vehicle 1, and
 a braking system of this vehicle 1, so as to be able to command a deceleration of the vehicle 1.

This control module 12 is programmed to control a driver-assistance function of the motor vehicle 1 depending on the signal acquired by said sensor 11.

More precisely, the control module 12 is programmed first of all:
 to detect the presence of an obstacle in the detection field 110 of the sensor 11, and to then determine the distance separating this obstacle from said sensor 11, or
 to detect the absence of obstacle in the detection field 110 of this sensor 11,
 by means of said sensor 11.

Preferably, the control module 12 is programmed to also determine a speed of movement of the obstacle the presence of which has thus been detected. This speed may for example be determined on the basis of at least two successive determinations of the distance separating this obstacle from said sensor 11.

The control module 12 is programmed to then control said driver-assistance function while taking into account, if there is need to (i.e. if this obstacle has been detected), the presence of this obstacle in the detection field 110 of the sensor.

The driver-assistance function may comprise a function for decreasing the speed of the motor vehicle allowing, in particular, on the approach of an obstacle, the motor vehicle 1 to be made to decelerate without intervention or with a minimal intervention by a driver of this vehicle 1.

When this function is active, the control module 12 controls the engine unit of the vehicle, and optionally the braking system, to, on the approach of an obstacle, make the vehicle 1 decelerate.

More precisely, the control module 12 is for example programmed to command such a deceleration when an obstacle is detected in the detection field 110 of the sensor 11, at a distance from the sensor 11 smaller than a given limiting distance.

This limiting distance may for example correspond to a stopping distance of the vehicle, or to a recommended safety distance.

This stopping distance corresponds, for a given speed of movement of the vehicle 1, to a distance required to make the motor vehicle 1 decelerate to a stop. This stopping distance may take into account the reaction time of the driver-assistance device 10, i.e. the time required to acquire and process said signal, then to trigger this deceleration.

This recommended safety distance for example corresponds, for a given speed of movement of the vehicle 1, to a distance travelled by the vehicle 1 (at this speed of movement) during a time corresponding to the average reaction time of a driver, or to the reaction time of the driver-assistance device 10.

The aforementioned limiting distance may also be determined depending on the speed of movement of the detected obstacle and/or the speed of the vehicle 1.

The control module 12 may also be programmed to command such a deceleration when the speed of movement of the detected obstacle is lower than the speed of the motor vehicle 1.

The control module 12 may also be programmed,
  to determine that an obstacle detected beforehand in the detection field 110 is no longer present in this detection field 110, and
  to then control the engine unit so as to return to the speed at which the motor vehicle 1 was moving before detection of this obstacle.

Automatic adaptation of the speed of the motor vehicle 1 to its road environment (or ACC, acronym for "Adaptive Cruise Control") is thus implemented by the control module 12.

The driver-assistance function may also comprise a function for automatically following a vehicle allowing, when another vehicle is in front of the motor vehicle 1 equipped with the driver-assistance device 10, in the same lane, the distance separating the two vehicles to be kept approximately equal to a setpoint distance, and this to be done without intervention, or with a minimal intervention, by the driver. The obstacle the presence of which is detected in the detection field 110 of said sensor 11 then corresponds to this followed vehicle.

To implement this driver-assistance function, the control module 12 is for example programmed to control the speed of the vehicle 1 in such a way that the distance separating said sensor 11 from the followed vehicle, which distance is determined on the basis of the signal acquired by this sensor 11, is approximately equal to this setpoint distance.

This setpoint distance may for example be equal to the aforementioned safety distance.

The control module 12 may also be programmed, when an obstacle is detected in the detection field 110 of said sensor 11, to control the engine unit, and optionally the braking system, so that the motor vehicle 1 reaches a setpoint speed, this setpoint speed being determined in particular depending on the distance separating the sensor 11 and this obstacle, and optionally depending on the speed of movement of this obstacle.

According to one particularly noteworthy feature, the control module 12 is programmed:

a) to detect, on the basis of a position of the motor vehicle 1 that is equipped therewith, and of characteristics of the road 2 that it is following, a section 20 of this road 2 located outside of the detection field 110 of said sensor 11 (as is shown in FIGS. 2 to 6B), and b) in case of detection of this road section 20 located outside of the detection field 110 of said sensor 11, to control said driver-assistance function while taking into account the potential presence of an obstacle on said road section 20.

Steps a) and b) are described in more detail below.

Step a).

Preferably, the driver-assistance device 10 comprises a navigation system 13 including locating means that are suitable for determining said position of the motor vehicle 1, and digital map data comprising said characteristics of the road 2 followed by the motor vehicle 1.

The locating means for example comprise a system for receiving and processing GPS or GSM signals (GSM being the acronym for "Global System for Mobile communication") permitting a determination of a position of the vehicle 1 and here of geographic coordinates allowing the location of the vehicle 1 to be pinpointed.

The digital map data in particular describe the road network that the vehicle 1 is using. These map data in particular describe the layout of the roads of this network, and for example indicate, for each of these roads, the geographic coordinates of a plurality of successive points located along this road. These map data may also include, for each of these points, an indication of the curvature, direction or slope of the corresponding road, at this point.

The vehicle 1 may thus be located on this road network, by finding a match between its geographic coordinates and said digital geographic data (i.e. via a "Map Matching" process). In particular, the navigation system 13 may thus identify the road 2 on which the motor vehicle 1 is being driven, determine its position along this road 2, and the direction in which the motor vehicle 1 is travelling along this road 2. The navigation system 13 may also determine an orientation of the motor vehicle 1 with respect to the direction that this road 2 has in terms of the vehicle 1.

Characteristics of this road 2, which are representative of the geometry of a portion of this road 2 toward which the motor vehicle 1 is moving, may then be deduced from the digital map data of the navigation system 13.

The control module 12 is then programmed to detect that a section 20 of this road 2 is located outside of the detection field 110 of said sensor 11, on the basis:

of the position and of the orientation of the motor vehicle 1 with respect to this road 2,
  of the data representative of the position of the limits of the detection field 110 of said sensor 11 with respect to this vehicle 1, and
  of the characteristics of the portion of the road 2 toward which the motor vehicle 1 is moving, which characteristics are provided by the navigation system 13.

To this end, the control module 12 may for example be programmed:

to superpose the data representative of the position of the limits of this detection field 110 with the map data provided by the navigation system 13, given the position and orientation of the vehicle 1, then
  to determine whether a section of this road 2 is located outside of the limits of this detection field 110.

The control module may also be programmed to detect said road section 20 when the characteristics of the portion of the road 2 toward which the motor vehicle 1 is moving indicate an abrupt change in direction of this road 2, for example corresponding to a sharp bend, or when they indicate a notable change in the slope of the road 2, for example corresponding to the peak of an incline.

FIGS. 2 to 6B schematically show various road configurations in which a section 20 of the road 2 followed by the motor vehicle 1 is located outside of the detection field 110 of said sensor, this being detected by the control module 12, as explained above.

In the configuration shown in FIG. 2, the motor vehicle 1 is being driven in a straight line over a rectilinear road segment, which is followed by a sharp bend. The road section 20 located beyond this bend (in the direction of movement of the vehicle 1) is thus located outside of the detection field 110 of said sensor 11.

FIGS. 4A and 4B schematically show, at two successive times, a similar road configuration to that of FIG. 2, in which the motor vehicle 1 is furthermore following another vehicle 3.

In the situation corresponding to FIG. 4A, these two vehicles are located on the rectilinear road segment, and therefore the followed vehicle 3 is at least partially located in the detection field 110 of said sensor 11. The followed vehicle 3 is on the point of entering the bend beyond which said road section 20 is located.

In the situation corresponding to FIG. 4B, the motor vehicle 1 equipped with the driver-assistance device 10 is again located on the rectilinear road segment, whereas the followed vehicle 3 has passed the bend, and is thus located on said road section 20, outside of the detection field 110 of said sensor 11.

In the configuration shown in FIG. 3, the motor vehicle 1 is moving toward the peak of an incline. The road section 20 located beyond the peak of this incline (in the direction of movement of the vehicle 1) is located outside of the detection field 110 of said sensor 11.

FIGS. 5A and 5B schematically show, at two successive times, a road configuration similar to that of FIG. 3, in which the motor vehicle 1 is furthermore following another vehicle 3.

In the situation corresponding to FIG. 5A, these two vehicles are moving toward the peak of this incline. The followed vehicle 3 is at least partially located in the detection field 110 of said sensor 11, and is on the point of passing the peak of the incline.

In the situation corresponding to FIG. 5B, the motor vehicle 1 equipped with the driver-assistance device 10 has still not passed the peak of this incline, whereas the followed vehicle 3 is already located on the other side of the peak of this incline. The followed vehicle 3 is thus located on said road section 20, outside of the detection field 110 of said sensor 11.

FIG. 6A schematically shows a road configuration in which the motor vehicle 1 is following another vehicle 3. The road 2 followed by these vehicles 1, 3 exhibits substantial changes in slope. It comprises a first segment having a high slope, followed by a second approximately horizontal segment, itself followed by a third segment once again having a high slope. The two vehicles 1, 3 are located on this first road segment, which they are descending. The followed vehicle 3 is then located at least partially in the detection field 110 of the sensor 11 with which the first vehicle 1 is equipped. The road section 20 comprising the second and third segments is in contrast located outside of this detection field 110.

FIG. 6B schematically shows the same road configuration as FIG. 6A, at a subsequent time. The vehicle 1 equipped with the driver-assistance device 10 is still located on the first road segment, whereas the followed vehicle 3 is located on the second road segment, on said road section 20, outside of the detection field 110 of said sensor 11.

Step b)

Preferably, the control module 12 is programmed, when said road section 20 has been detected in step a):

to evaluate a distance d20; d3' separating the motor vehicle 1 from a position at which, or from which, the obstacle potentially present on this road section 20 is liable to be located, and to control said driver-assistance function depending on this distance d20; d3'.

Two modes of evaluating and taking into account such a distance are described below.

According to a first embodiment, the control module 12 is programmed to determine, on the basis of the data having served to detect said road section 20 (digital map data in particular), a distance d20 separating the motor vehicle 1 and the detected road section 20.

This distance d20 for example corresponds to a distance separating a front end of the vehicle 1 and the end of this road section 20 located on the side of the vehicle 1 (i.e. corresponding to the end of this road section closest to the vehicle 1).

This distance d20 is evaluated along a line located on the road 2, for example along a centre line of this road. Thus, this distance d20 is not necessarily evaluated along a straight line, as may be seen in FIGS. 2 and 3. It is representative of the distance to be travelled, between the motor vehicle 1 and said road section, for a path taken along this road 2.

The control module 12 is then programmed to control said driver-assistance function while taking into account the potential presence of an obstacle, for example an immobile obstacle, at the distance d20 from the motor vehicle 1.

More particularly, when said driver-assistance function comprises the function described above for decreasing the speed of the vehicle 1 on the approach of an obstacle, the control module 12 commands a deceleration of the vehicle 1 when the distance d20 separating the motor vehicle 1 and said detected road section 20 is smaller than the aforementioned limiting distance.

According to a second embodiment, the control module 12 is programmed:

when the presence of an obstacle in the detection field 110 of said sensor 11 is detected on the basis of the signal acquired by this sensor 11, then this obstacle exits from the detection field 110 of this sensor 11 and said road section 20 is detected in step a), to then conclude that said obstacle is present on said road section 20.

This obstacle may in particular correspond to another vehicle 3, followed by the motor vehicle 1 equipped with the driver-assistance device 10.

Thus, when the motor vehicle 1 is following this other vehicle 3, if the latter exits from the detection field 110 of said sensor 11, and said road section 20 is detected in step a), the control module 12 here concludes that this followed vehicle 3 is present on said road section 20 located outside of the detection field 110.

Preferably, the control module 12 is then programmed, when it has thus concluded that said obstacle is present on said road section 20:

to determine a probable distance d3' separating this obstacle and the motor vehicle 1 (this probable distance d3' is shown in FIGS. 4B, 5B and 6B), depending on a distance d3, between said obstacle and said sensor 11, determined on the basis of the signal having permitted beforehand the presence of this obstacle in the detection field 110 of said sensor 11 to be detected (this distance d3 is shown in FIGS. 4A, 5A and 6A).

Preferably, the control module is furthermore programmed to determine said probable distance d3' depending on a speed v3 of movement of this obstacle, determined depending on said signal having permitted beforehand the presence of this obstacle in the detection field 110 of said sensor 11 to be detected.

Here, the control module 12 is more precisely programmed, when the motor vehicle 1 is following another vehicle 3:

to detect the presence of this followed vehicle 3 in the detection field 110 of said sensor 11, and to determine, on the basis of the signal acquired by this sensor 11, the distance d3 separating the two vehicles 1, 3 at the time t of this detection, and the speed v3 of the followed vehicle 3 with respect to the vehicle 1 that is following it; then to detect the absence of the followed vehicle 3 from the detection field 110 of said sensor 11, and to detect said road section 20 located outside of this detection field (in step a) described above); then to determine that the followed vehicle 3 is located on said road section 20; then to estimate the probable distance d3' separating the followed vehicle 3 and the motor vehicle 1 that is following it, depending on the distance d3 and the speed v3 of the followed vehicle, which distance and speed were determined beforehand when this followed vehicle 3 was present in the detection field 110 of said sensor 11.

The control module 12 may for example be programmed to determine the value of this probable distance d3', at a time t', using the following formula F1:

$$d3'=d3+v3\times(t'-t) \quad (F1).$$

More generally, the control module 12 may be programmed to determine this probable distance d3' by extrapolation, at the time t', from distances separating the two vehicles 1, 3 at prior times, determined by means of said sensor 11.

The distance d3 and the probable distance d3' are each evaluated along a line located on the road 2, for example along a centre line of this road. Thus, the distances d3, d3' are not necessarily evaluated along a straight line, as may be seen in FIGS. 4A to 6B. Each of these distances is representative, at a given time, of a distance to be travelled between the two vehicles 1, 3 for a path taken along this road 2.

In this second embodiment, the control module 12 is programmed, once said probable distance d3' has been determined, to control said driver-assistance function while taking into account the presence of said obstacle at this probable distance d3' from the vehicle 1.

In particular, when said driver-assistance function comprises the function described above for decreasing the speed of the vehicle 1 on the approach of an obstacle, the control module 12 commands a deceleration of the vehicle 1 when said probable distance d3' is smaller than the aforementioned safety distance.

When the driver-assistance function comprises the function for automatically following a vehicle described above, the control module 12 is programmed, when it has concluded that the followed vehicle 3 is present on said road section 20, to control the speed of the vehicle 1 that is equipped therewith so that said probable distance d3' separating the followed vehicle 3 from the vehicle 1 that is following it is approximately equal to the aforementioned setpoint distance.

In other words, when the control module 12 concludes that the followed vehicle 3 has exited from the detection field 110 of said sensor 11 in order to enter onto said road section 20, it bases its decisions, with respect to controlling the speed of the vehicle 1, no longer on a distance determined by means of this sensor 11, but on said probable distance d3', which it estimates as explained above.

The control module 12 thus advantageously continues to perform this automatic-vehicle-following function, even if the followed vehicle 3 momentarily exits from the detection field 110 of said sensor 11.

This operating mode is very advantageous, in particular when the road 2 followed is winding, or when it exhibits frequent changes in slope, because a followed vehicle then frequently exits from the detection field of such a sensor, without however leaving the road portion toward which the vehicle equipped with the driver-assistance device is moving.

As a variant, the control module 12 may of course be programmed so as to combine the features of the two embodiments described above.

Provision may also be made for the control module 12 to be programmed, in step b), to control said driver-assistance function without, to do so, evaluating a distance from which an obstacle is potentially present. In this case, the control module 12 may for example be programmed to command the motor vehicle 1 to reach a lower setpoint speed, when said road section 20 located outside of the detection field 110 is detected.

FIG. 7 schematically shows the main steps of a driver-assistance method implemented in the driver-assistance device 10 described above.

In this method, the control module 12 of the driver-assistance device 10 controls a driver-assistance function of the motor vehicle 1 depending on a signal, which is acquired by the sensor 11 described above, and which is representative of the presence of an obstacle in the interior of the detection field 110 of this sensor 11.

This driver-assistance function may in particular comprise the function for automatically following a vehicle and/or the function for decreasing the speed of the motor vehicle 1 on the approach of an obstacle, which functions were presented above.

According to one particularly noteworthy feature, in this method, the control module 12 executes steps a) and b), which were described in detail above.

The organization of the main steps of this method, with respect to one another, is now described in more detail.

Here, this method starts with a step E1, in which the control module 12 tests whether an obstacle is present in the detection field 110 of said sensor 11, on the basis of the signal acquired by this sensor 11.

In step E1, when the presence of this obstacle is thus detected, the control module furthermore determines a distance d3 separating the vehicle 1 from this obstacle, and a speed of movement of this obstacle v3, on the basis of said signal.

When the presence of this obstacle is detected in step E1, the method then continues with a step E2 (arrow T1 in FIG. 7), in which the control module 12 controls said driver-assistance function, while taking into account the presence of the obstacle thus detected in this detection field 110. For example, if the distance d3 between this obstacle and the vehicle 1, which distance is determined in step E1, is smaller than the limiting distance presented above, the control module 12 may, in step E2, command a deceleration of the vehicle 1, as explained above.

After step E2, this method here returns to step E1 (arrow T2 in FIG. 7).

When no obstacle is detected in the detection field 110 of said sensor 11, in step E1, the method continues with step a) (arrow T3 in FIG. 7).

When the control module 12 detects, in step a), that the road portion 2 toward which the motor vehicle 1 is moving contains a road section 20 located outside of the detection field 110 of said sensor 11, the method continues with step b) (arrow T4 in FIG. 7).

Once step b) has been executed by the control module 12, while taking into account, as explained above, the potential presence of an obstacle on said road section 20, the method here returns to step E1 (arrow T6 in FIG. 7).

When the control module 12 does not detect, in step a), such a road section located outside of the detection field 110 of said sensor 11, the method continues with a step E3 (arrow T5 in FIG. 7).

In step E3, the control module 12 controls said driver-assistance function while taking into account the probable absence of obstacles on the road portion toward which the vehicle is moving. To do this, the control module may for example command the vehicle 1 to adopt a speed recommended for this road portion in the absence of other vehicles.

After step E3, the process here restarts with step E1 (arrow T6 in FIG. 7).

As a variant, the steps of this method may be organized differently with respect to one another. For example, provision may be made for step E1 and for step a) to be repeated a plurality of times continuously, and for the results of these steps to then be combined by the control module 12 with a view to controlling said driver-assistance function.

The invention claimed is:

1. A self-contained driver-assistance device for assisting with driving a motor vehicle following a road, the driver-assistance device comprising:
  a sensor for acquiring a signal representative of the presence of an obstacle in an interior of a detection field of the sensor; and
  a control module that is programmed to:
    control a driver-assistance function for assisting with driving the motor vehicle, depending on the signal acquired by said sensor,
    a) detect, on the basis of a position of the motor vehicle and of characteristics of said road, a section of the road located outside of the detection field of said sensor, and
    b) in case of detection of this road the section of the road located outside of the detection field of said sensor, control said driver-assistance function while taking into account the potential presence of the obstacle on said road section,
    wherein the self-contained driver assistance device is limited to only the motor vehicle which detects the obstacle.

2. The driver-assistance device according to claim 1, in addition comprising a navigation system including locating means for determining said position of the motor vehicle, and digital map data comprising said characteristics of the road followed by the motor vehicle.

3. The driver-assistance device according to claim 1, wherein said characteristics of the road followed by the motor vehicle comprise a piece of information representative of a change in direction and/or in slope of the road followed by the motor vehicle.

4. The driver-assistance device according to claim 1, wherein the control module is programmed:
  in step a), determine, on the basis of said position of the motor vehicle and of said characteristics of the road that it is following, a distance separating the motor vehicle from said road section, and
  in step b), control said driver-assistance function while taking into account this distance separating the motor vehicle from said road section.

5. The driver-assistance device according to claim 4, wherein said driver-assistance function comprises a function for decreasing the speed of the motor vehicle on the approach of an obstacle.

6. The driver-assistance device according to claim 5, wherein the control module is programmed, in step b), to command a deceleration of the motor vehicle when the distance separating the motor vehicle from said road section is smaller than a given limiting distance.

7. The driver-assistance device according to claim 5, wherein said signal is representative of a distance separating the sensor and the obstacle present in its detection field.

8. The driver-assistance device according to claim 7, wherein the control module is programmed:
  when the presence of an obstacle in the detection field of said sensor is detected on the basis of the signal acquired by this sensor, then this obstacle exits from the detection field of this sensor and said road section located outside of the detection field of this device as detected in step a),
  to then conclude that said obstacle is present on said road section, and to control said driver-assistance function while taking into account the presence of this obstacle on said road section.

9. The driver-assistance device according to claim 8, wherein the control module is programmed:
  when it is concluded that said obstacle is present on said road section,
  to then determine a probable distance separating this obstacle and the motor vehicle, depending on a distance, between said obstacle and said sensor, determined on the basis of the signal having permitted beforehand the presence of this obstacle in the detection field of said sensor to be detected, and
  to control said driver-assistance function depending on said probable distance.

10. The driver-assistance device according to claim 9, wherein the control module is furthermore programmed to determine said probable distance separating the motor vehicle and said obstacle depending on a speed of movement of this obstacle, determined depending on said signal having permitted beforehand the presence of this obstacle in the detection field of said sensor to be detected.

11. The driver-assistance device according to claim 9, wherein the control module is programmed to command a deceleration of the motor vehicle when said probable distance is smaller than a given safety distance.

12. The driver-assistance device according to claim 9, wherein, said obstacle is another motor vehicle followed by the motor vehicle equipped with the driver-assistance device, and said driver-assistance function comprises a function for automatically following a vehicle, wherein the control module is programmed to control the speed of the motor vehicle that is equipped therewith so that, when it is concluded that said followed vehicle is present on said road section, said probable distance is about equal to a given set point distance.

13. The driver-assistance device according to claim 1, wherein said sensor comprises an image sensor.

14. The driver-assistance device according to claim 1, wherein said characteristics of the road followed by the motor vehicle comprise characteristics which are representative of the geometry of a portion of said road.

15. A driver-assistance method for assisting with driving a motor vehicle following a road, in which a control module controls a driver-assistance function for assisting with driving the motor vehicle depending on a signal, acquired by a sensor, representative of the presence of an obstacle in an interior of a detection field of this sensor, the method comprising:
  a) detecting, on the basis of a position of the motor vehicle and of characteristics of said road, a section of this road located outside of the detection field of said sensor; and b) in case of detection of this road section located outside of the detection field of said sensor, controlling said driver-assistance function while taking into account the potential presence of an obstacle on said road section, wherein the self-contained driver assistance device is limited to only the motor vehicle which detects the obstacle.

\* \* \* \* \*